US010853508B2

(12) United States Patent
Kohen et al.

(10) Patent No.: US 10,853,508 B2
(45) Date of Patent: Dec. 1, 2020

(54) METHOD AND SYSTEM FOR REACTIVE MINING OF COMPUTER SCREENS

(71) Applicant: Teramind Inc., Long Island City, NY (US)

(72) Inventors: Yizhak Kohen, Givat Shmuel (IL); Andrii Kukareka, Kyiv (UA)

(73) Assignee: Teramind Inc., Long Island City, NY (US)

( * ) Notice: Subject to any disclaimer, the term of this patent is extended or adjusted under 35 U.S.C. 154(b) by 177 days.

(21) Appl. No.: 15/879,470

(22) Filed: Jan. 25, 2018

(65) Prior Publication Data

US 2018/0218162 A1    Aug. 2, 2018

Related U.S. Application Data

(60) Provisional application No. 62/450,098, filed on Jan. 25, 2017.

(51) Int. Cl.
| | | |
|---|---|---|
| *G06F 17/00* | (2019.01) | |
| *G06F 21/62* | (2013.01) | |
| *G06F 16/25* | (2019.01) | |
| *G06F 16/583* | (2019.01) | |
| *G06K 9/00* | (2006.01) | |
| *H04L 29/06* | (2006.01) | |
| *G06F 16/30* | (2019.01) | |
| *G06K 9/32* | (2006.01) | |
| *G06F 21/84* | (2013.01) | |
| *G06K 9/34* | (2006.01) | |
| *G06F 40/30* | (2020.01) | |

(52) U.S. Cl.
CPC ............ *G06F 21/62* (2013.01); *G06F 16/258* (2019.01); *G06F 16/30* (2019.01); *G06F 16/5846* (2019.01); *G06F 21/6245* (2013.01); *G06F 21/84* (2013.01); *G06K 9/00979* (2013.01); *G06K 9/325* (2013.01); *H04L 63/104* (2013.01); *G06F 40/30* (2020.01); *G06K 9/344* (2013.01)

(58) Field of Classification Search
CPC ...... G06F 21/62; G06F 21/84; G06F 21/6245; G06F 17/30569; G06F 17/30253; G06F 17/2785; G06F 16/30; G06F 16/258; G06F 16/5846; G06K 9/344; G06K 9/00979; G06K 9/325; H04L 63/104
USPC .............................................................. 726/1
See application file for complete search history.

(56) References Cited

U.S. PATENT DOCUMENTS

| | | | | |
|---|---|---|---|---|
| 7,917,554 B2* | 3/2011 | Hull | ...................... | G06F 40/117 707/999.102 |
| 7,979,700 B2* | 7/2011 | Elazar | ..................... | G06F 21/10 348/558 |
| 8,544,058 B2* | 9/2013 | Lim | ...................... | G06F 21/604 726/1 |
| 9,047,166 B2* | 6/2015 | Nishio | ...................... | G06F 8/71 |
| 9,152,946 B2* | 10/2015 | Rankin, Jr. | ........... | G06F 16/245 |
| 9,887,887 B2* | 2/2018 | Hunter | ..................... | H04W 4/21 |

(Continued)

*Primary Examiner* — Amare F Tabor
(74) *Attorney, Agent, or Firm* — Mark M. Friedman

(57) ABSTRACT

Systems and methods provide for text mining, and in particular text mining of screens, of endpoint and other target computers and devices, of an enterprise or network. The text mining from the screen is based on the text that the end point user actually sees, as is actually displayed on the screen. As a result of the text mining, action can be taken against the endpoint computer.

15 Claims, 11 Drawing Sheets

(56) References Cited

U.S. PATENT DOCUMENTS

| | | | |
|---|---|---|---|
| 2001/0047373 A1* | 11/2001 | Jones | G06F 40/106 |
| | | | 715/210 |
| 2015/0302421 A1* | 10/2015 | Caton | G06Q 30/018 |
| | | | 705/17 |
| 2016/0323281 A1* | 11/2016 | Griesmeyer | G06F 16/00 |
| 2018/0040019 A1* | 2/2018 | Gavlovski | G06Q 30/0255 |

* cited by examiner

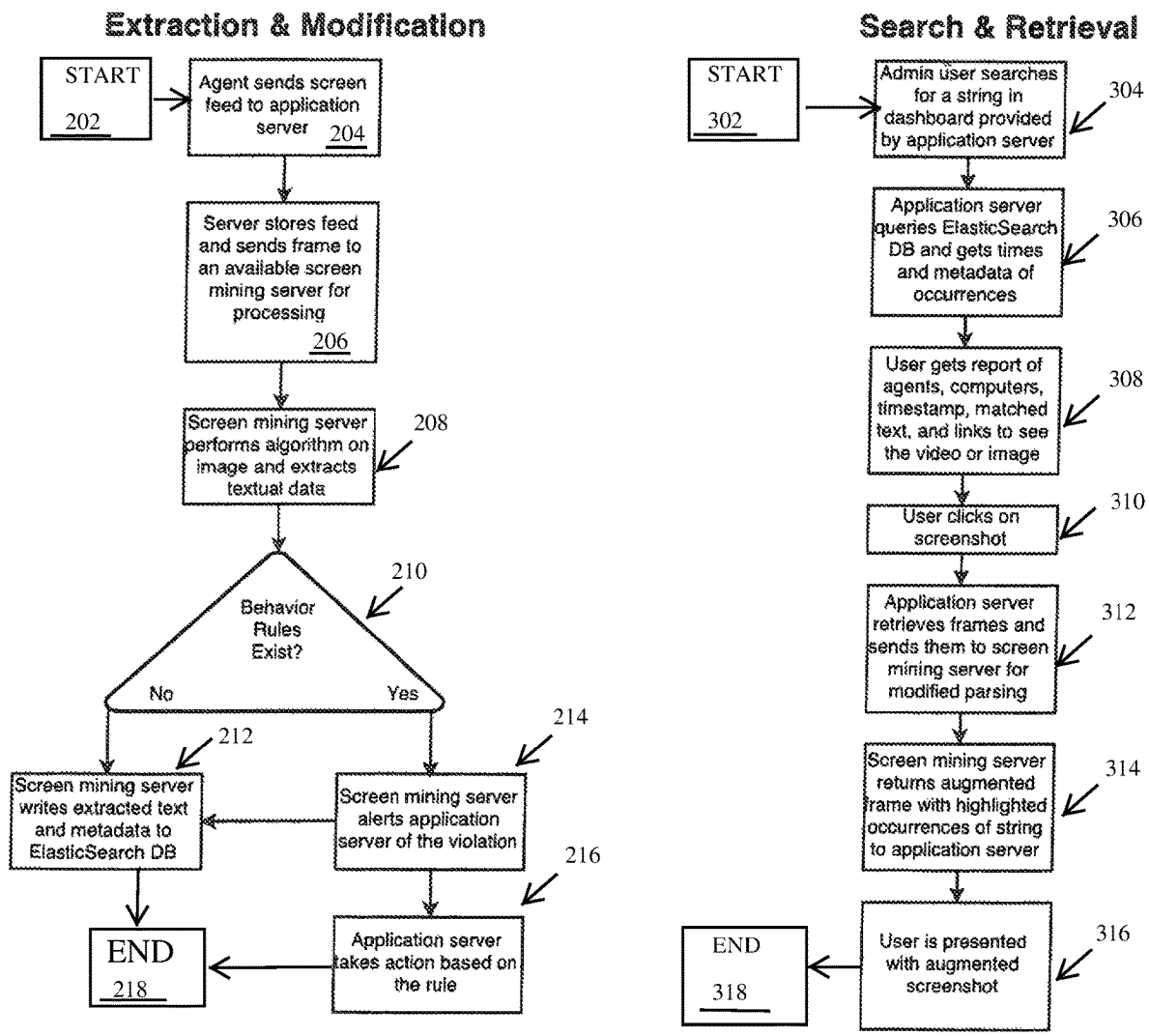

```
("future", "english", [ 72, 53, 122, 66 ]),
("שלום", "hebrew", [ 188, 80, 206, 92 ]),
("космос", "russian", [88, 150, 120, 163])
... etc
```

FIG. 5B

METHOD AND SYSTEM FOR REACTIVE MINING OF COMPUTER SCREENS

CROSS REFERENCES TO RELATED APPLICATIONS

This application is related to and claims priority from commonly owned U.S. Provisional Patent Application Ser. No. 62/450,098, entitled: Method and System for Reactive Mining of Computer Screens, filed on Jan. 25, 2017, the disclosure of which is incorporated by reference in its entirety herein.

TECHNICAL FIELD

The present invention is directed to data mining and in particular screen mining.

BACKGROUND

When running an enterprise which handles sensitive information, such as individuals' health records, for example, as governed by the Health insurance Portability and Accountability Act of 1996 (HIPAA), great care must be taken as to the privacy of these records, and who accesses and views these records inside the enterprise. One common way of doing this is by using software that performs text indexing.

Text indexing software typically uses the Microsoft® Active Accessibility (MSAA) API (Application Programming Interface). Windows® applications can selectively publish their text via MSAA, such that the software can be applied to this text in order to index it. However, the use of MSAA is limited and has several drawbacks. For example, several widely used and well known applications, such as Chrome® from Google® do not publish text to MSAA by default. Major run-time engines, such as Java® do not publish text to MSAA. The MSAA API does not detect text which appears inside images, such as PDF (portable document format) and graphical buttons. Finally, this MSAA API, as of now, only works with Windows®.

SUMMARY

The present invention provides systems and methods for text mining, and in particular, text mining of computer and computer device (device) screens (screen displays, monitors, and the like, which display graphics including text), of endpoint and other target computers and devices, of an enterprise or network. The text mining from the screen is based on the text that the end point user actually sees, as is actually displayed on the screen. As a result of the text mining, and analysis of the mined text, action can be taken against the endpoint computer.

The present invention provides systems and methods for text mining, and in particular text mining of screens, of endpoint or target (targeted) computers and devices, of an enterprise or network. The text mining from the screen is, for example, reactive text mining, and is based on the text that the end point user actually sees, as is actually displayed on the screen. The text also includes text that appears in graphics such as PDF's buttons, photos and the like. The displayed text is captured and indexed in real time, with the user, computer and time the screen shot was taken being recorded. The methods and systems of the invention are platform agnostic, in that they will index text in any window, graphic or screen, regardless of the Application Programming Interface (API) or operating system.

The methods and systems are such that rules and policies are enforced proactively, to detect text and react in cases where sensitive, privileged, or other text is being viewed by an unauthorized, e.g., unprivileged or uncredentialed, viewer, or authorized viewers not in accordance with the system rules and policies, or being viewed on an unauthorized machine. This typically results in the machine being locked by the system.

The system and methods also operate on the screen displayed text, to blur selective text, for recording.

For example, the user may be a bank worker working in the audit department of the bank. When the user is conducting an audit of Mr. X, he is credentialed to access all of the bank's present audit customers. While entitled to see the records of Mr. X, the entity being audited, the worker accesses the documents of Ms. Y, a known celebrity who the bank is auditing. The worker is not supposed to be viewing any documents of Ms. Y, only those of Mr. X. The system catches this unauthorized viewing of Ms. Y's documents by the worker, via the process of the invention, and reports it to the administrator. At this time, the system administrator can lock out the worker from accessing all documents, files and other electronic records of the bank clients being audited.

Embodiments of the invention are directed to a method for reactively mining computer screens. The method comprises: obtaining data of an image of a screen display from a target computer; converting the data of the image into text; analyzing the text to determine whether there are rules and policies to be applied to the text; and, should there be rules and policies to be applied to the text, determining whether the analyzed text violates at least one of the rues and policies, and, if at least one of the rules and policies is violated, determining whether action is to be taken on the target computer or the screen display of the target computer.

Optionally, when it is determined that an action is to be taken on the target computer or the screen display of the target computer, in response to the analyzed text violating at least one of the rules and policies, one or more actions is caused. These actions include, for example: logging the event being analyzed; closing the current program running on the target computer; locking out the target computer user by locking the target computer; disallowing use of the target computer; notifying an administrator with a notification presented to the administrator on the computer of the administrator; sending a presentable warning notification to the target computer; locking the target computer via its keyboard, mouse, inputs and touch screen; blocking text on the screen display of the target computer; and, blurring at least a portion of the screen display of the target computer, the at least a portion of the screen display including text.

Optionally, the obtaining the data of the image of the screen display includes receiving the data of the screen display as transmitted from an agent, on the target computer.

Optionally, the rules and policies include triggers, which are activated upon the detection of predetermined text.

Optionally, the predetermined text includes at least one of, a value, a regular expression, a program name containing a value, a uniform resource locator (URL), time and day of the image of screen display, and time and day range of the image of the screen display.

Optionally, the converting the image into text includes decoding the image, and, recognizing regions on the image that can hold text, such that the image portions in these regions is converted into text.

Optionally, the rules and policies include behavioral rules.

Optionally, prior to converting the obtained image into text, the obtained image is stored in storage media.

Optionally, the text and data associated with the image of the screen display is indexed and stored in storage media.

Optionally, the data associated with the image includes one or more of: the time the screen display of the image was captured, the target computer from which the screen display was captured, the application being run by the target computer, the web site to which the browser of the target computer was directed, the location on the screen display of the rule or policy violating text, whether the text triggered any rules and policies, the rules and policies triggered, and metadata.

Embodiments of the invention are directed to a method for obtaining an image of a screen display, based on a search of a system. The method comprises: receiving a query for a data string; querying an indexing server to obtain occurrences of the data string; providing a screen display image for the occurrences of the data string, which satisfy the query, in the form of at least one activatable link; upon receiving an activation of the at least one activatable link, obtaining data of the screen display image, and, converting the data of the screen display into text; and, providing the text including the data string as the response to the query.

Optionally, the providing the text includes the data string being highlighted.

Optionally, the data string corresponds to text that violates at least one rule and policy of the system.

Embodiments of the invention are directed to a system for reactively mining computer screens. The system comprises: a first server configured for obtaining data of an image of a screen display from a target computer; a second server configured for: a) receiving the data of the image of the screen display; b) converting the data of the image into text; c) analyzing the text to determine whether there are rules and policies to be applied to the text; and, d) should there be rules and policies to be applied to the text, determining whether the analyzed text violates at least one of the rues and policies; and, if at least one of the rules and policies is violated, the first server determines whether action is to be taken on the target computer or the screen display of the target computer.

Optionally, the first server, upon determining that an action is to be taken on the target computer or the screen display of the target computer, in response to the analyzed text violating at least one of the rules and policies, is configured for causing one or more actions. These actions include: logging the event being analyzed; closing the current program running on the target computer; locking out the target computer user by locking the target computer; disallowing use of the target computer; notifying an administrator with a notification presented to the administrator on the computer of the administrator; sending a presentable warning notification to the target computer; locking the target computer via its keyboard, mouse, inputs and touch screen; blocking text on the screen display of the target computer; and, blurring at least a portion of the screen display of the target computer, the at least a portion of the screen display including text.

Optionally, the system additionally comprises an agent for sending the data of the image of the screen display on the target computer to the first server.

Optionally, for the system, the rules and policies include triggers, which are activated upon the detection of predetermined text.

Optionally, for the system, the rules and policies include behavioral rules.

Optionally, for the system, the predetermined text includes at least one of, a value, a regular expression, a program name containing a value, a uniform resource locator (URL), time and day of the image of screen display, and time and day range of the image of the screen display.

Optionally, for the system, the second server is additionally configured for converting the image into text including: decoding the image, and recognizing regions on the image that can hold text, such that the image portions in these regions is converted into text.

Embodiments of the invention are directed to a method for reactively mining computer screens. The method comprises: electronically obtaining an image of a screen display from a target computer, for example, an endpoint computer; converting the image into text; and, analyzing the text by applying rules to the text, to determine whether action is to be taken on the target computer.

Optionally, the method additionally comprises: indexing the text, and, wherein the applying rules to the text includes applying behavioral rules to the indexed text.

Optionally, the method additionally comprises, when it is determined that an action is to be taken as a result of at least one rule being applied to the text is violated, taking at least one action. The at least one action is one of: logging the event being analyzed, closing the current program running on the target computer, locking out the target computer user by locking the target computer, disallowing use of the target computer, notifying an administrator with a notification presented to the administrator on the computer of the administrator, sending a presentable warning notification to the target computer, locking the target computer via its keyboard, mouse, inputs and touch screen, blocking text on the screen display of the target computer, and blurring at least a portion of the screen display, the at least a portion including text, of the target computer.

This document references terms that are used consistently or interchangeably herein. These terms, including variations thereof, are as follows.

Throughout this document, a "web site" is a related collection of World Wide Web (WWW) files that includes a beginning file or "web page" called a home page, and typically, additional files or "web pages." The term "web site" is used collectively to include "web site" and "web page(s)."

A uniform resource locator (URL) is the unique address for a file, such as a web site or a web page, that is accessible over Networks including the Internet.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

A "client" is an application that runs on a computer, workstation or the like and relies on a server to perform some of its operations or functionality.

"n" and "nth" refer to the last member of a varying or potentially infinite series.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 2 is a flow diagram for an extraction and modification process in accordance with embodiments of the invention;

FIG. 3 is a flow diagram for a search and retrieval process in accordance with embodiments of the invention;

FIGS. 4A and 4B are screen shots taken during operation of embodiments of the invention;

FIG. 5B is a diagram of a list of words, language, and on-screen rectangle;

DETAILED DESCRIPTION OF THE DRAWINGS

Figure 1A:
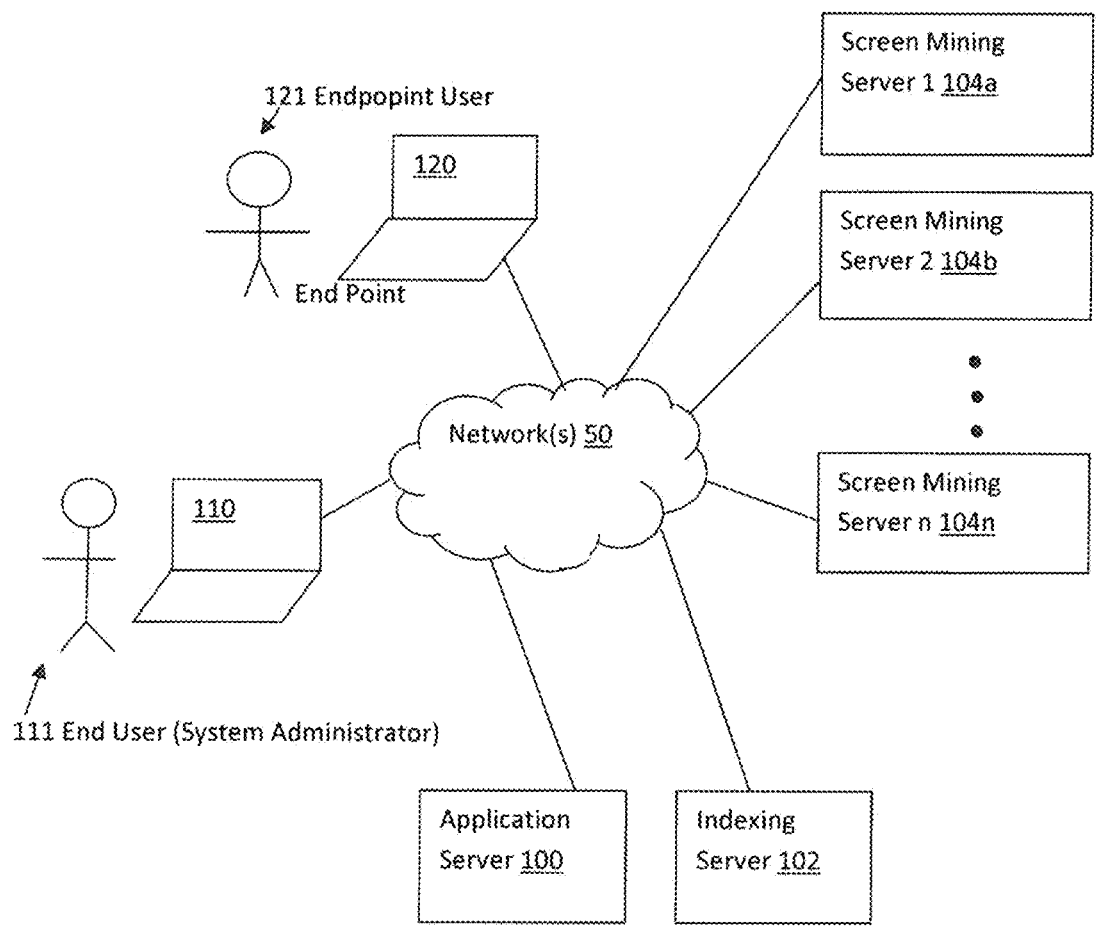
FIG. 1A is a diagram of an exemplary environment showing the invention in an exemplary operation.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Reference is now made to FIG. 1A, which shows an exemplary operating environment, including a network 50, to which is linked an application server 100, an indexing server 102 and screen mining servers 104a-104n, defining a system of the invention. This system, for example, may also include components, and applications, e.g., client applications, associated with the application server 100. An end user computer 110, such as that of a system administrator 111 also links to the network 50, as is an endpoint computer 120 of an endpoint user 121, representative of the multiple endpoint computers/endpoint users along the network 50. The endpoint user 121, via his computer 120, is for example, a targeted user, as his activity is being observed, both in real time and retroactively (past usage). The network 50 is, for example, a communications network, such as a Local Area Network (LAN), or a Wide Area Network (WAN), including public networks such as the Internet. As shown in FIG. 1A, the network 50 is either a single network or a combination of networks and/or multiple networks, including also (in addition to the aforementioned communications networks such as the Internet), for example, cellular networks. "Linked" as used herein includes both wired or wireless links, either direct or indirect, and placing the computers, including, servers, components and the like, in electronic and/or data communications with each other.

Figure 1B:
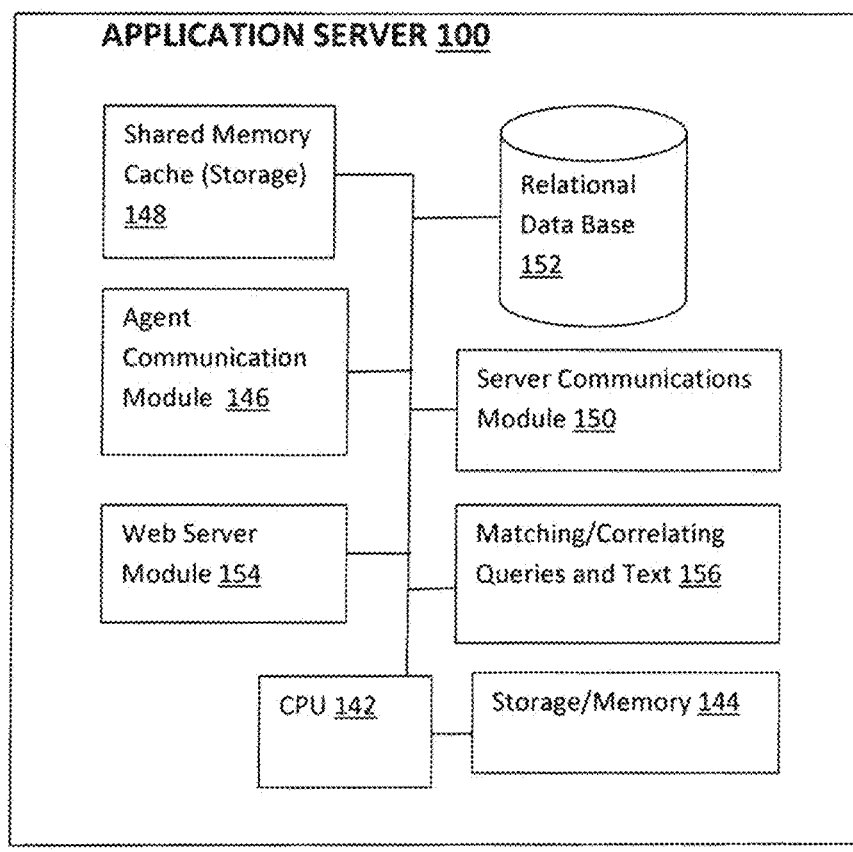
FIG. 1B is a block diagram of the Application Server shown in FIG. 1A.

Turning also to FIG. 1B, the application server 100 provides the logic and logic functions for the invention. The server 100 is configured for capturing all data, including screen data coming from all endpoints/endpoint computers, such as endpoint computer 120. The server 100 includes a central processing unit (CPU) 142, formed of one or more processors. The CPU 142 is linked to storage/memory 144 for storing machine executable instructions, executable by the CPU 142, for performing the processes of the application server 100, as detailed below. The CPU 142 also links either directly or indirectly to an agent communication module 146, a shared memory cache (storage) 148, a server communications module 150, a relational database 152, a web server module 154 and a matching and correlation text queries module 156 (for generating reports and the like).

This server 100 obtains screen shots (the data associated therewith) by employing an agent (for example, the agent is installed on an endpoint computer, such as computer 120), at the various endpoint computers 120 and forwards the screen shot data to the screen mining servers 104a-104n, via the agent communication module 146. This server 100 also enforces rules and policies, and maintains a shared memory for the caches, e.g., storage 148, associated with the screen mining servers 104a-104n, as the screen mining servers 104a-104n are, for example, stateless. While the application server 100 is shown as a single server, this is for illustrative purposes only, as this server 100 may be embodied in one or more servers, components and the like.

The application server 100 is configured to take actions, via the server communications module 150, with respect to the screen text having been analyzed in accordance with the application of various rules and policies (which are, for example, stored in the application server 100). These actions include, for example, one or more of: logging the event being analyzed, closing the current program running on the endpoint computer 120, locking out the endpoint computer user 121 by locking the user out of his computer 120, notifying the administrator 111, via a notification presented to the administrator 111 on his computer 110, or by other means, warning the endpoint user 121, by sending a presentable warning notification to the endpoint computer 120 associated with the user 121, locking the endpoint computer 120 via its keyboard and mouse inputs, blocking the text that triggered the violation on the recording and the screen shot, and blurring certain portions of the screen when certain text, such as credit card numbers is present.

The application server 100 also includes a relational data base 152 for storing session metadata, a web server module 154 for serving the dashboard of the administrator 111, and a matching/correlating queries and text module 156, which communicates with the indexing server 102.

The indexing server 102 provides indexing functions. For example, the indexing server 102 indexes all obtained text, from the screen mining servers 104a-104n, in order to accommodate a rapid look up of the text by entities including, for example, the end user/system administrator 111 via his computer 110. The indexing server 102 also serves to retrieve metadata when queried, in order to access stored data, by, for example, the application server 100 or the system administrator computer 110, or both.

While the indexing server 102 is shown as a single server, this is for illustrative purposes only, as this indexing server 102 may be embodied in one or more servers, components and the like. Example indexing servers 102 include, for example, a server running Elasticsearch™ from Elastic of Mountain View Calif., USA, which includes a distributed search and analytics engine.

The screen mining servers 104a-104n are such that they are scalable. As the screen mining servers 104a-104n are the same or similar to each other, and accordingly, the description of server 104a applies to all screen mining servers 104b-104n.

Figure 1C:
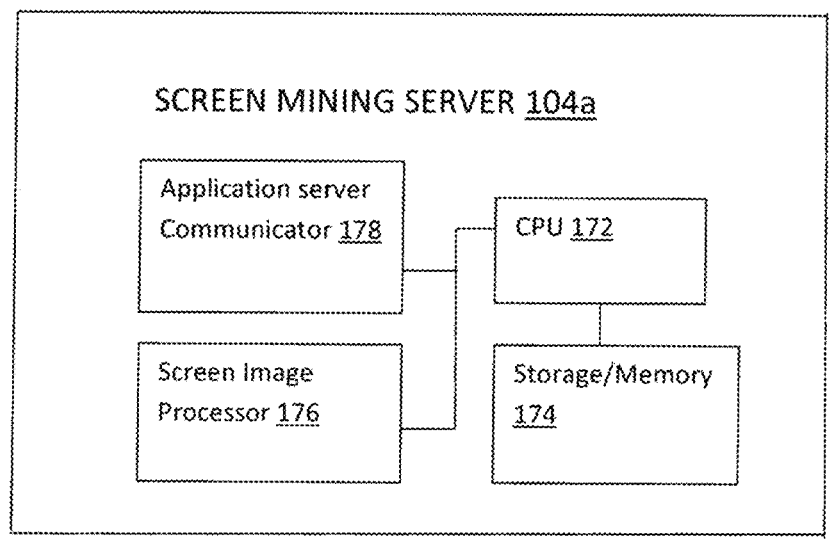
FIG. 1C is a block diagram of the Screen Mining Server shown in FIG. 1A.

As shown in FIG. 1C, the server 104a includes a central processing unit (CPU) 172, formed of one or more processors. The CPU 172 is linked to storage/memory 174 for storing machine executable instructions, executable by the CPU 172, for performing the processes of the screen mining server 104a server, as detailed below. The CPU 172 also links either directly or indirectly to a screen image processor module 176 and a application server communicator module 178.

The screen mining server 104a, via screen image processor module 176, is configured to take a screen shot, which is typically in the form of an image, and incrementally parses and/or extracts text from it. This extracted text is sent to the indexing server 102 to be indexed as well as acted on by other processes, as described for the indexing server 102 above. The screen mining server 104a, is typically stateless, such that it does not store the data associated with the screen shots it captures and converts to text. The screen mining server 104a, for example, receives screen shots (e.g., screen shot data) from the application server 100, and decodes the screen shots (e.g., screen shot data), in an exemplary manner as follows.

Initially, the screen mining server 104a, via the screen image processor module 176, performs a process on the screen shot image, which defines contour lines. The process recognizes regions of the screen shot that are able to hold text, for example, providing these regions as rectangle areas. A hash digest is then taken for each rectangle area. The screen mining server 104a then checks the shared memory of the application server 100, to determine whether the image of the screen shot has been seen with this hash previously. If the screen shot has been seen with the hash previously, the screen mining server 104a captures the text from the cache of the application server 100. If the screen shot has not been seen with the hash previously, the screen mining server 104a performs an OCR (Optical Character Recognition) function on the text, and attempts to extract text within a certain degree of confidence. The obtained text is stored (and saved) in a cache on the application server 100.

The screen mining server 104a writes to the indexing server 102, i.e., the indexing server search database, the text of the screen shot, the time of screen shot capture, the user computer the screen shot was captured from, here, for example, endpoint computer 120, the application the endpoint computer was running, the web site to which the browser was directed if in the browser, where on the screen shot the block of text of interest was found, whether the text triggered any rules and/or policies, and if yes, which specific rules or policies, and any relevant metadata. This is performed by the application server communicator module 178.

The screen mining server 104a, via screen image processing module 176, then checks text behavior rules and policies, as defined by the system administrator 111, and which are stored as such on the application server 100. Rules and/or policies may include triggers, which may be formed by one or more conditions, including, for example, the captured text matches one of an absolute value, e.g., any text, or a regular expression, e.g., a US Social Security Number, expressed as [0-9] {3}-[0-9] {2}-[0-9] {4}, a program name contains a value, a website URL (Uniform Resource Locator) contains a value, the time of day/day of the week the screen shot references is within a time/day or a preset range.

Should a rule and/or policy be triggered, the screen mining server 104a notifies the application server 100, the time and position of the text in the screen shot, that triggered the violation.

Attention is now directed to FIGS. 2 and 3, which show flow diagrams detailing computer-implemented processes in accordance with embodiments of the disclosed subject matter. Reference is also made to elements shown in FIG. 1A. The process and subprocesses of FIGS. 2 and 3 are computerized processes performed by the system of the invention, for example, at least the application server 100, indexing server 102 and screen mining server(s) 104a-104n, and an agent, installed, for example on an endpoint computer to be monitored, such as endpoint computer 120. The aforementioned processes and sub-processes can be, for example, performed manually, automatically, or a combination thereof, and, for example, in real time.

FIG. 2 shows a process performed by the system of the invention for extraction of data, i.e., screen shots from an endpoint computer, e.g., computer 120, and modification of the endpoint computer. At block 202, the process starts, where the agent is installed on the endpoint computer 120.

At block 204, the agent sends data of the screen shot to the application server 100, where it is received. At block 206, the application server 100 stores the screen shot data in a cache 148, and sends the data to one or more screen mining servers 104a-104n. The screen shot data stored in the cache 148 includes, for example, data for the screen shot images, a report of agents, computers, timestamps, matched text, and links to see the video or the image of the screen shot (screen display). The screen mining servers 104a-104n process the screen shot data and convert it into text, at block 208. The processes of block 208 are described in detail below in FIGS. 5A-8.

The process moves to block 210, where in the application server 100, it is determined whether there are applicable rules and policies to be applied to this screen shot data. If there are not any rules to be applied, the process moves to block 212, where the screen mining server(s) 104a-104n writes the extracted text and meta data to an indexing server database on the indexing server 102, where the text is indexed for archiving and future use. The process moves to block 218 where it ends.

Returning to block 210, should there be rules to be applied, the process moves to block 214, where the screen mining server(s) 104a-104n alerts the application server 100 of the rules or policy violation. Violations include, for example, a certain word or words, group or groups of letters and/or characters, which may include words, phrases, or a regular expression appearing. From block 214, the process moves to both blocks 212 and 216. The process moves from block 214, the process moves to block 212, and proceeds as detailed above for block 212, ending at block 218.

Moving to block 216, the application server 100 takes action based on the violation being detected. The actions to be taken include, for example, one or more of: logging the event being analyzed, closing the current program running on the endpoint computer 120, locking out the endpoint computer user 121 by locking his computer 120 (disallowing the user to access his computer), notifying the administrator 111, via a notification presented to the administrator 111 on his computer 110, or by other means, warning the endpoint user 121, by sending a presentable warning notification to the endpoint computer 120 associated with the user 121, locking the endpoint computer 120 via its keyboard and mouse (pointing device) inputs (and touch screen capabilities, with contacts, swipes and the like on the touch screen corresponding to mouse inputs), blocking the text that triggered the violation on the recording and the screen shot, and blurring certain portions of the screen when certain text, such as credit card numbers is present.

From block 216, the process moves to block 218, where it ends.

FIG. 3 shows an example search and retrieval process performed by the disclosed system. The process begins at the START block 302. The process moves to block 304, where the application server 100 provides the user computer 110 of the system administrator 111 with a dashboard for the user computer 110 display screen, from which the system administrator 111 enters a query to search for a data string. The process moves to block 306, where the application server 100 queries the indexing server 102, indexing database, and receives times and occurrences of the metadata matching or otherwise correlating to the query.

At block 308, the application server 100 provides, for example, by transmitting to, the system administrator computer 110, a report 402, produced by the matching/correlating module 156 with data including that from the indexing server 102 and/or the cache 148, the report of agents, computers, timestamps, matched text, and links to see the video or the image of the screen shot (screen display). This report 402 (screen shot of the report) is shown, for example, in FIG. 4A, with a link to the screen shot of occurrence 406, shown for example in of FIG. 4B, by an activatable icon 408. This icon 408 is activatable by a mouse click (indicated by an arrow 410 in FIG. 4A) or other maneuver, such as a swipe, contact (if the display screen is a touch screen) or the like on the display screen of the computer displaying the report.

Moving to block 310, the user has activated the screen shot of occurrence 406, and clicks on, or otherwise activates the occurrence of the screen shot 406, the click or other activation received in the application server 100. The process moves to block 312, where the application server 100 retrieves frames (of the screen shots) from storage (e.g., cache 148), and sends these frames to one or more screen mining servers 104a-104n, for modified parsing. The processes of block 312 are described in detail below in FIGS. 5A-8 (processes 500, 600, 700, 800).

Figure 4A:
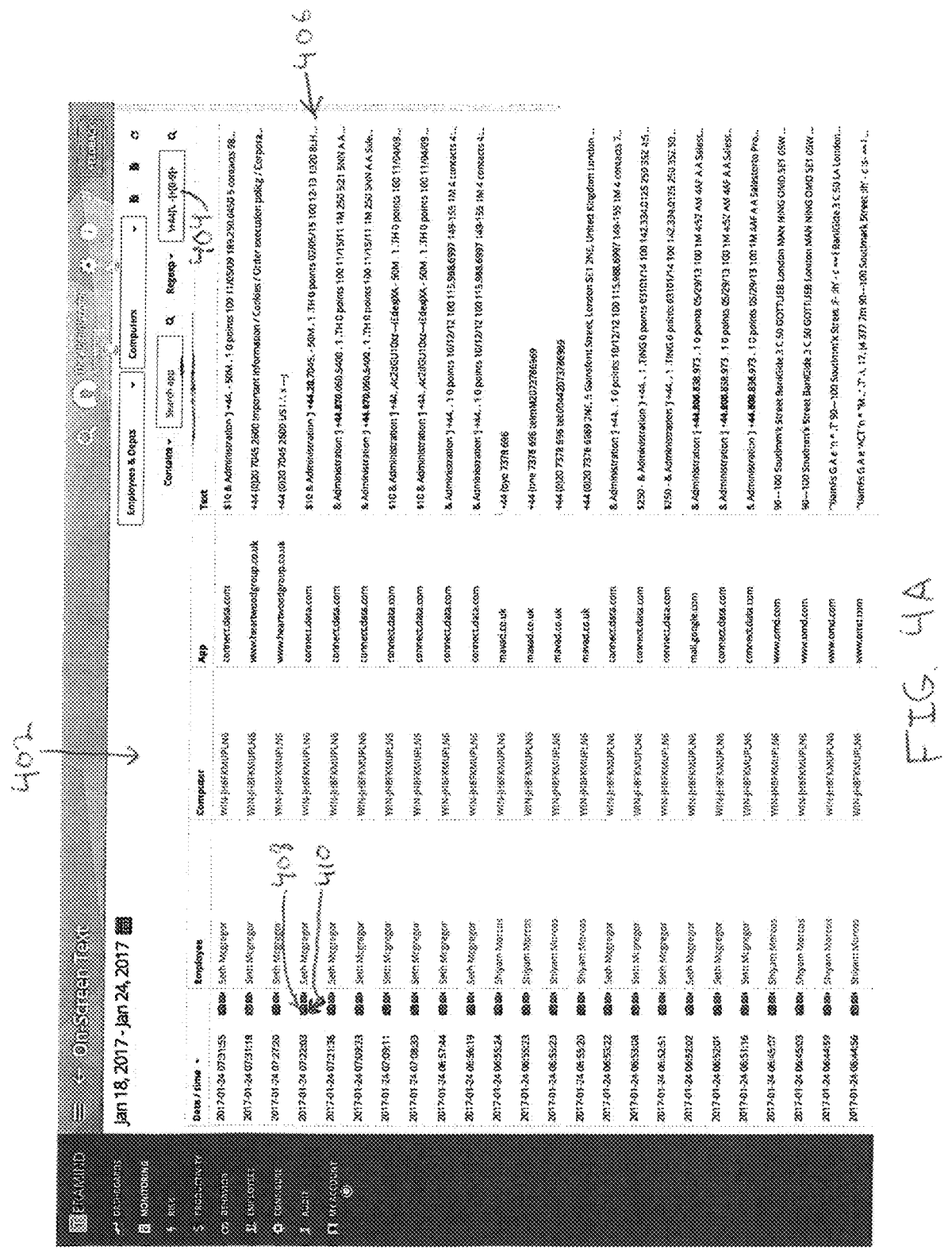
Figure 4B:
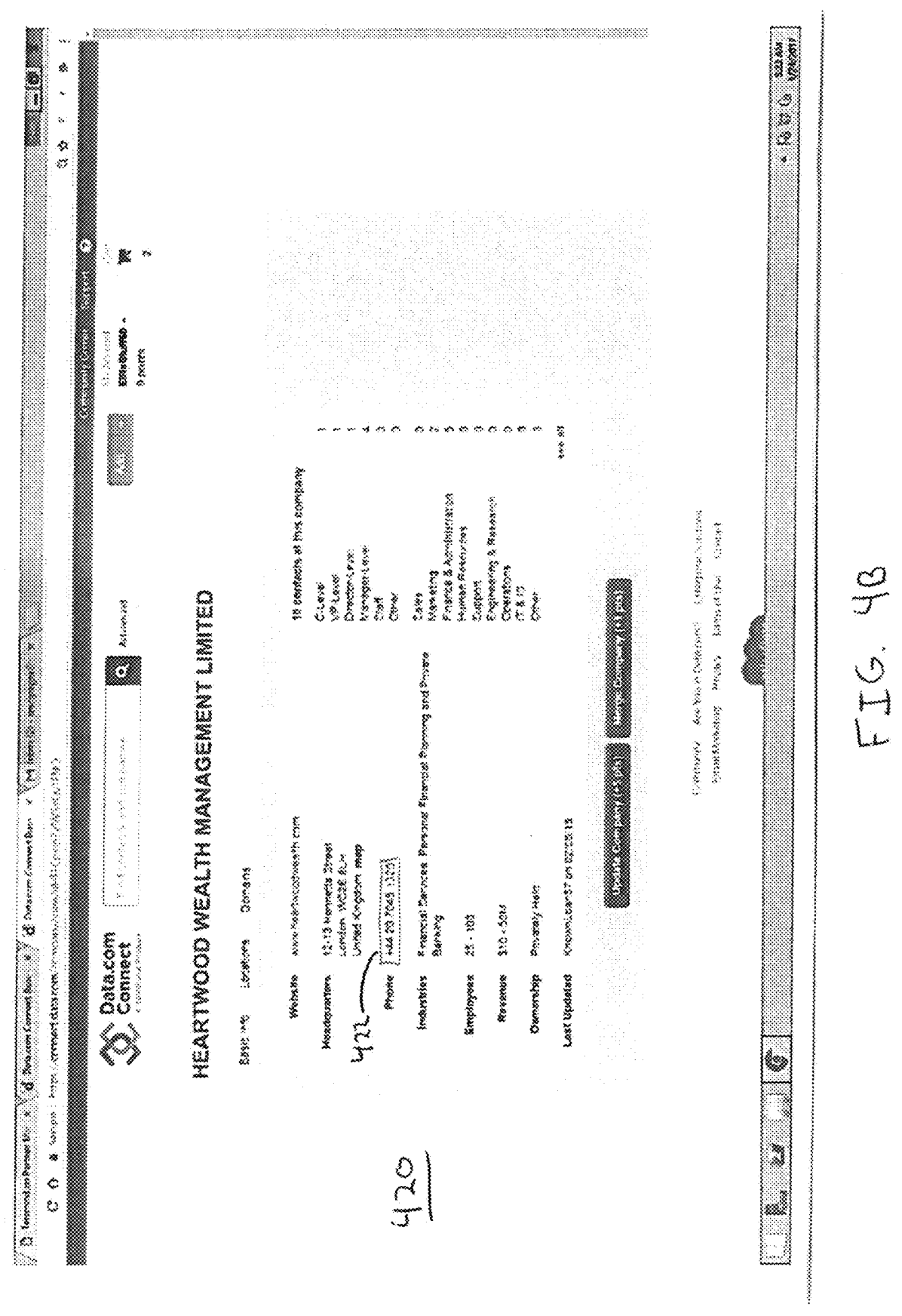

For example, modified parsing includes, the application server 100 sending a query (in text form) (which is in the query box 404 of the screen display 402, of FIG. 4A) to the screen mining server 104a, and the screen mining server 104a searches for the query text, e.g., a match of the regular expression "\+44[\.-]+[0-9]{4}+", and displays the results on screen 420 of FIG. 4B. The screen mining server 104a then sends the application server 100 the coordinates of the matching or otherwise correlated text, which in FIG. 4A is found at the line 406, for example. The coordinates are, for example, text inside the screen images (frames). The user then clicks on the icon 408 corresponding to the requisite screen shot 420, which is displayed in FIG. 4B. The application server 100 overlays highlighting on the matching or otherwise correlated text 422, and then the application server 100 sends this augmented screen image 420 to the user, e.g., the computer 110 of the system administrator 111 who made the query and input it into the application server.

The process moves to block 314, where the screen mining server(s) 104a-104n returns (or return) the coordinates of the text inside the image (frame), with a screen shot highlighted occurrences of matching, or otherwise correlated, strings to the application server 100. The application server 100, then sends the user computer, e.g., system administrator computer 110, the data, associated with the returned augmented frame with highlighted occurrences of strings, at block 316. This data upon reaching the user computer, e.g., system administrator computer 110, presents on the user computer 110 display screen as an augmented screen shot.

The system administrator 111 can now observe any violations, and take any necessary action against the endpoint computer, e.g., computer 120, from which the screen shot originated. These actions may include actions described above for handling violations, or other actions. The process moves to block 318 where it ends.

Figure 5A:
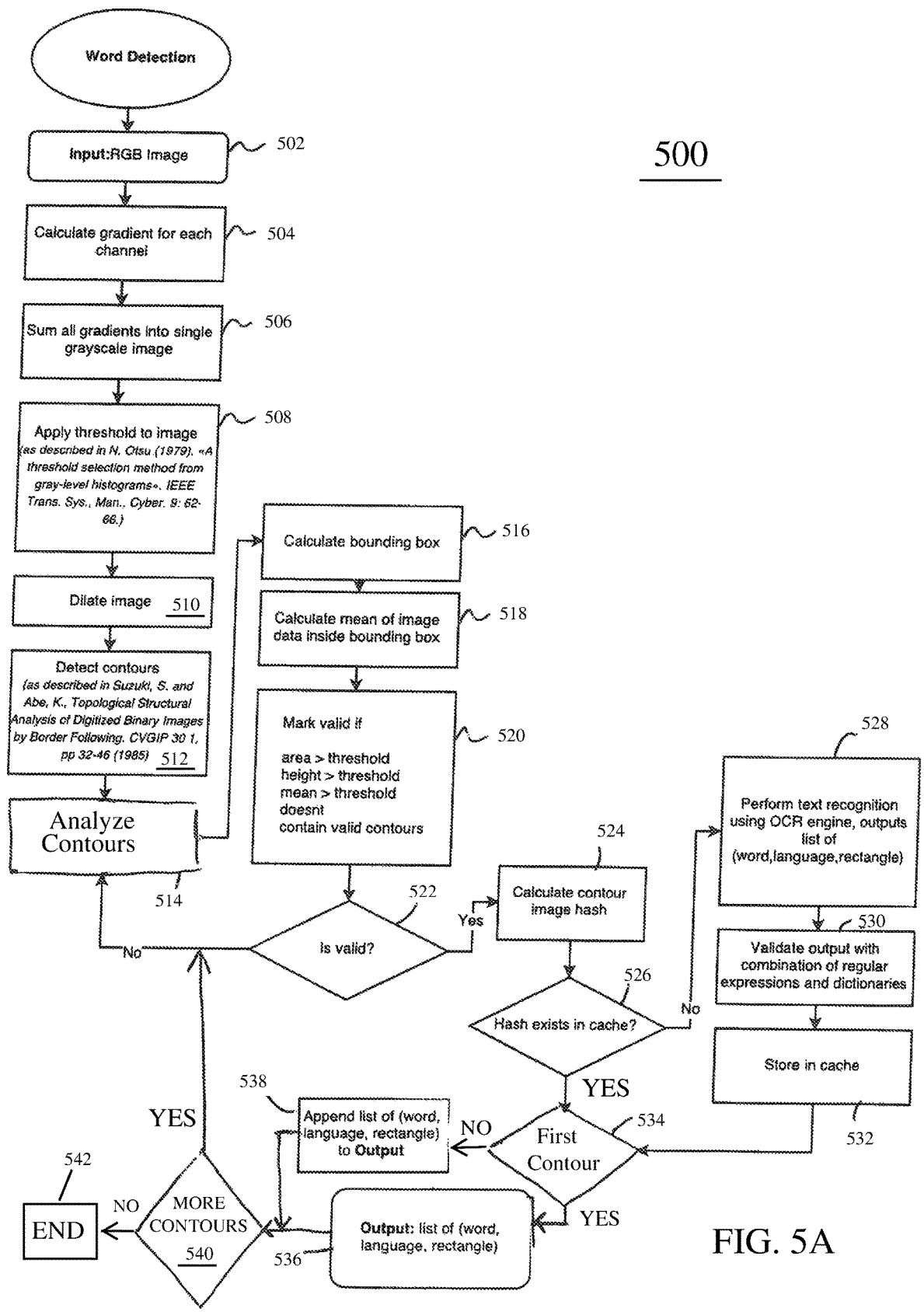
FIG. 5A is a flow diagram of a Word Detection process in accordance with embodiments of the invention.
Figure 6:
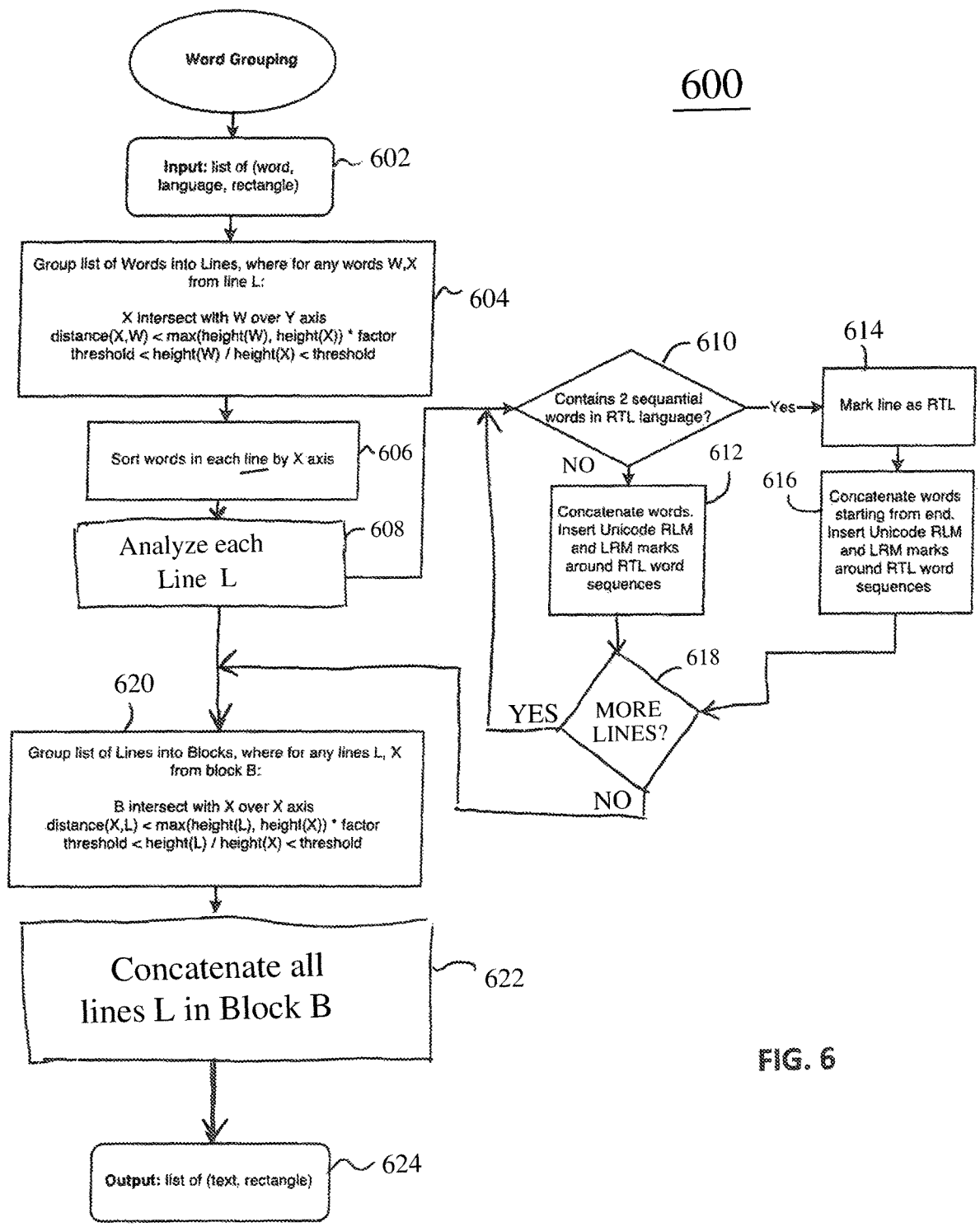
FIG. 6 is a flow diagram of a Word Grouping process in accordance with embodiments of the invention.
Figure 7:
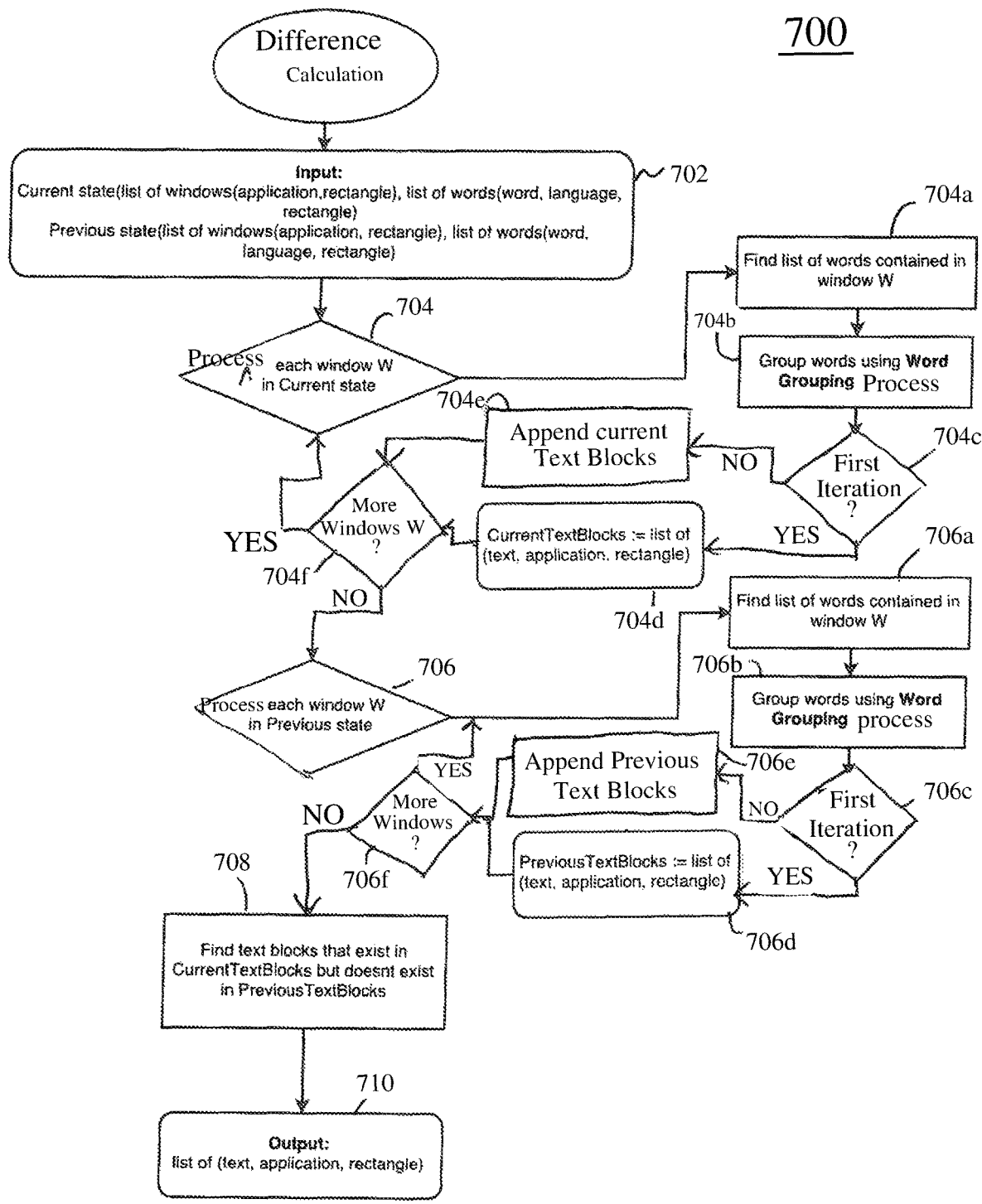
FIG. 7 is a flow diagram of a Difference Calculation process in accordance with embodiments of the invention; and, FIG. 8 is a flow diagram of a processing loop in accordance with embodiments of the invention.
Figure 8:
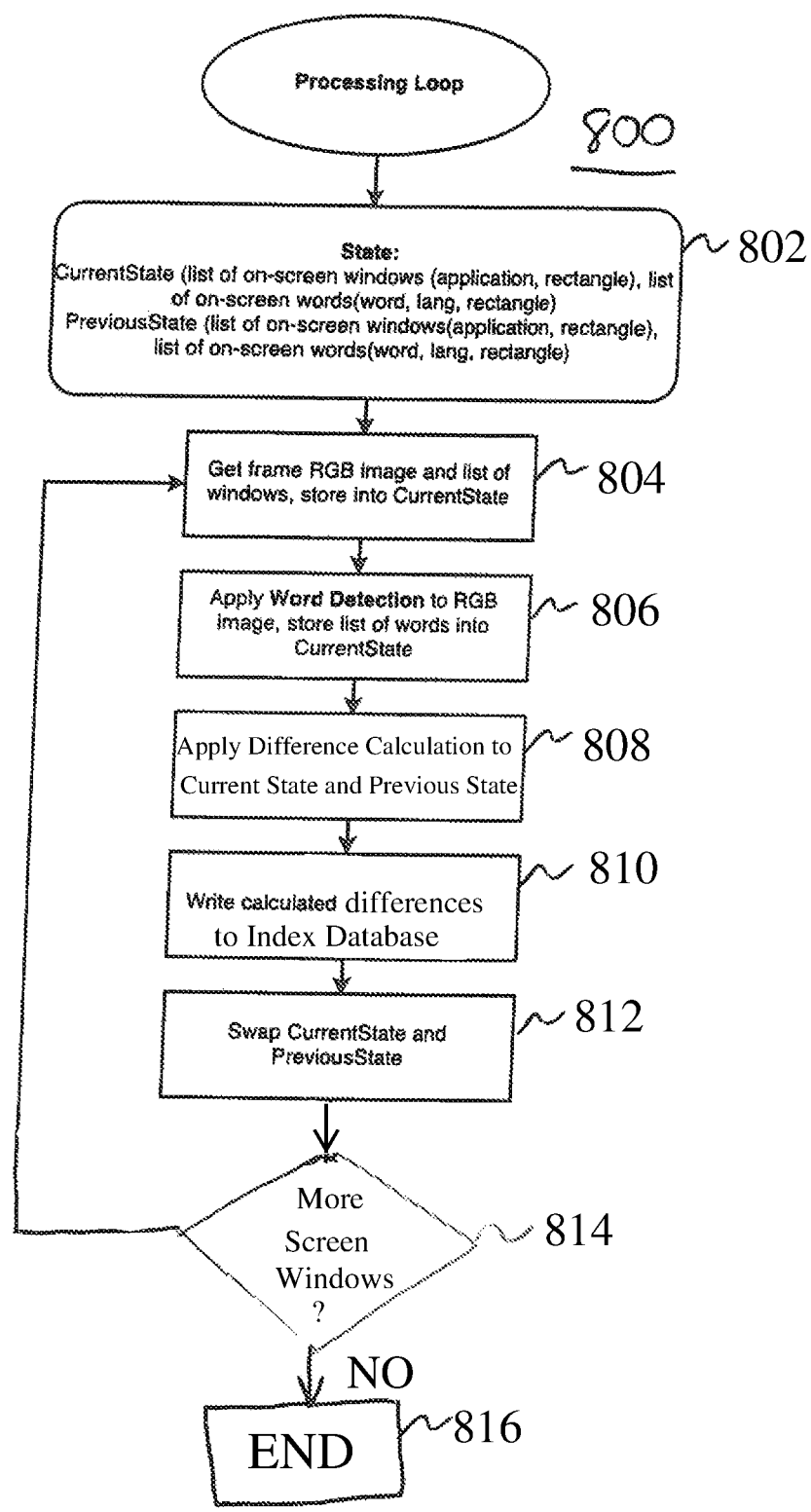

Attention is now directed to blocks 208 and 312, which detail processes of screen analysis. The process is formed of four processes, 1) Word Detection 500, as shown in FIG. 5A, 2) Word Grouping 600, as shown in FIG. 6, 3) Difference Calculation 700, as shown in FIG. 7, and, 4) a Processing Loop 800, as shown in FIG. 8. All of these processes 500, 600, 700 and 800 are performed, for example in the screen image processor module 176 of the screen mining servers 104a-104n.

As shown in FIG. 5A, the process of Word Detection 500 begins at block 502, where a Red/Green/Blue (RGB) image, with red, green and blue channels is input into block 504. At block 504, a gradient is calculated for each of the channels. At block 506, all of the gradients are summed into a single grayscale image. The process moves to block 508, where a threshold is applied to the single grayscale image. The determination of the threshold is determined in accordance with, N. Otsu, "A Threshold Selection Method From Gray-Level Histograms", in IEEE Trans. Sys. Man., Cyber, 9:62-66 (1979), the disclosure of which is incorporated by reference herein.

Next, the image is dilated, at block 510, and contours, e.g., image regions that may be text, are detected from the image, at block 512. The contours are detected, for example, in accordance with, Suzuki, S. and Abe, K., "Topological Structure Analysis of Digitized Binary Images by Boarder Following," in CVGIP, 30:1, pages 32-46 (1985), the disclosure of which is incorporated by reference herein.

The process moves to block 514, where each contour is analyzed. For each contour, actions defined in blocks 516 to 536 are performed. These actions result in the generation of a list of words with corresponding language and rectangles (the "word, language, rectangle," known as a "triple"), that are detected inside of this contour. These words are appended to process output as defined in block 538.

At block 516 a bounding box of a contour is calculated. The mean of the image data inside the bounding box is then calculated, as block 518. The process moves to block 520, where filtration occurs to determine whether the contour is valid. Valid contours are those, where, for example, the area of the contour is above a threshold, the height of a contour is above a threshold, the mean of image data inside the contour is above a threshold, and the contour itself does not contain any other valid contours. Based on the filtration at block 520, the process moves to block 522, where it is determined whether the contour is valid. If the contour is not valid, the process moves to block 514, from where it resumes. If the contour is valid, the process moves to block 524.

At block 524, an image hash of the contour is calculated. The process moves to block 526, where it is determined whether there has already exists in a cache (storage) in the application server 100. If yes, the process moves to block 534. If no at block 526, the process moves to block 528.

At block 528, text recognition is performed using an OCR (Optical Character Recognition) engine, which outputs a list of words, language, rectangles. The process moves to block 530, where the output is validated with regular expressions, dictionaries and the like. At block 532, the validated output is stored in a cache (storage). The process moves to block 534.

At block 534, it is determined whether this is the first contour being analyzed. If yes, the process moves to block 536, where an output list is created. The output list includes, for example, a list of words, language and rectangles. An example list is shown in FIG. 5B. If no, at block 534, an output list already exists, and the output list is appended (modified).

From both block 536 and block 538, the process moves to block 540. At block 540, it is determined whether there are more contours to analyze. If yes, the process moves to block 522, from where it resumes. If no, the process moves to block 542 where it ends.

FIG. 6 shows the second process of Word Grouping 600. Initially, at block 602, the output list of words, language rectangles, is the input into the system, e.g., the output of the Word Detection process 500. Moving to block 604, groups of words are grouped into lines, each line indicated as a line (L). Words are indicated as W, X, and for any words W, X from line L:

X intersects W over the Y axis;
the distance $(X,W) < \max[\text{height}(W), \text{height}(X)]*\text{factor}$; and,
the height(W)/height(X) falls between threshold values.

The process moves to block 606, where words on each line (L) in the direction of the X axis are sorted. Each line (L) is then analyzed, at block 608.

The process now moves to block 610, where the line (L) is analyzed to determine whether there are two sequential words in a Right To Left (RTL) language. If no, at block 610, the process moves to block 612, where words are concatenated. This is done, for example, by Inserting Unicode RLM (Right Left Marks) and LRM (Left Right Marks) around RTL word sequences, and calculating a bounding rectangle in all words in line L. From block 612, the process moves to block 618.

Returning to block 610, if yes, at block 610, the process moves to block 614, where the line L is marked as RTL. From block 614, the process moves to block 616, where words are concatenated starting from their end. This is done, for example, by Inserting Unicode RLM (Right Left Marks) and LRM (Left Right Marks) around RTL word sequences, and calculating a bounding rectangle in all words in line L. The process then moves to block 618.

At block 618, it is determined whether there are more lines to analyze. If yes, the process returns to block 610, from where it resumes. If no, the process moves to block 620.

At block 620 a list of lines L are grouped into blocks B. For any line L,X from block B:

B intersects with X over the X axis;
the distance $(X,L) < \max[\text{height}(L), \text{height}(X)]*\text{factor}$; and,
the height(L)/height(X) falls between threshold values.

The process moves to block 622, where block B is further processed, for example, by concatenating all of the lines L in block B. The process then moves to block 624, where output is generated, for example, a list of text, rectangles, and the like.

FIG. 7 shows a Difference Calculation process 700.

Initially, at block 702, the input of the process 700 is defined as:

CurrentState (list of windows with corresponding application name and window rectangle, list of words with corresponding language and rectangle).

PreviousState (list of windows with corresponding application name and window rectangle, list of words with corresponding language and rectangle).

The process moves to block 704, a first loop for each window W in the CurrentState. This loop includes blocks 704a-704f. At block 704a, a list of words contained in current window W is found. Next, the process moves to block 704b, where words are grouped, for example, using the Word Grouping process 600 of FIG. 6 and blocks 602-624, which generates lists of text blocks with corresponding rectangles. The process moves to block 704c, where it is determined whether this is the first iteration for the current window W. If yes, the process moves to block 704d, knowing the current window application and having a list of text blocks from block 704b. A list is built from "text, application, and rectangle," known as a "triple", of which one or more triples form CurrentTextBlocks. CurrentTextBlocks is a list of triples. For example, for a Current State that has the programs CHROME® (from Google®) and WORD® (from Microsoft) open, the resulting list is, for example:

["chrome.exe", "all text in chrome window", "100,100×300,300"]
["word.exe", "all text in word" "300,100×600,700"]

Where, "100,100×300,300" and "300,100×600,700" are the coordinates and dimensions of this window on the display screen and accordingly, in the corresponding screen shot (frame).

Returning to block 704c, if no, at block 704c, the CurrentTextBlocks is appended with the triple, at block 704e. From blocks 704d and 704e, the process moves to block 704f, where it is determined whether there are more current windows to process. If yes, the process moves to block 704/704a, from where the process resumes. If no, the process moves to block 706.

The process moves to block 706, a second loop for each window W in the PreviousState.

This loop includes blocks 706a-706f. At block 706a, a list of words contained in previous window W is found. Next, the process moves to block 706b, where words are grouped, for example, using the Word Grouping process 600 of FIG. 6 and blocks 602-624, which generates a list of blocks with corresponding rectangles. The process moves to block 706c, where it is determined whether this is the first iteration for the current window W. If yes, the process moves to block 706d, knowing the current window application and having a list of text blocks from block 706b. A list is built from the "text, application, and rectangle" "triple", as defined above, of which one or more triples for PreviousTextBlocks. If no, at block 706c, the current text block is appended with the triple, at block 706e. From blocks 706d and 706e, the process moves to block 706f, where it is determined whether there are more current windows to process. If, yes, the process moves to block 706/706a, from where the process resumes. If no, the process moves to block 708.

At block 708, the differences between the lists from blocks 704 and 706 are calculated. This includes, for example, finding text blocks that exist in the current window W, which do not occur in the text blocks of the previous window W.

From block 708, the process moves to block 710, where list of text, applications and rectangles calculated at block 708, are outputted, by the Difference Calculation process 700.

FIG. 8 shows a processing loop 800. At block 802, the state of the process is defined as:

1) a CurrentState list of windows (each window indicated by a W)(application, rectangle), and a list of on-screen words (word, language, rectangle), per window; and, 2) a PreviousState list of windows application, rectangle), and a list of on-screen words (word, language, rectangle), per window.

The process moves to block 804, where a frame of an RGB screen image and list of windows is stored, for example, in volatile memory. The process moves to block 806, where the process of Word Detection of FIG. 5A, as described above is performed on the RGB screen images. A list of words obtained from this process is then placed temporarily in the memory, for example, volatile memory.

The process moves to block 808, where the Difference Calculation Process 700 of FIG. 7, as detailed above, is applied to the Current State and Previous State, as per block 802, to obtain new text blocks that appeared on-screen. The calculated differences are then written into an indexing server database, at block 810. The process moves to block 812, where the CurrentState is exchanged with the PreviousState. Once text is saved, the process prepares to receive the next frame. When it does, what was the CurrentState frame in the previous loop is now the PreviousState, as a new frame comes in to the memory.

From block 812, the process moves to block 814, where it is determined whether there are screen windows to be analyzed. If yes, the process moves to block 804, from where it resumes. If no, the process moves to block 816, where it ends.

The implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for reactively mining computer screens comprising:
    obtaining data of an image of a screen display from a target computer;
    converting the data of the image into text, including determining regions on the image that hold text, and converting the image in each region into text;
    analyzing the text of the regions to determine whether there are rules and policies to be applied to the text; and,
    should there be rules and policies to be applied to the text, determining whether the analyzed text violates at least one of the rues and policies, and,
    if at least one of the rules and policies is violated, determining whether action is to be taken on the target computer or the screen display of the target computer, the method additionally comprising:

assigning a hash digest for each region;

determining, for each region whether the same hash digest has been captured previously; and, if the same hash digest for the region has been captured previously, obtaining the text of the region as the text to be analyzed; and, if the same hash digest for the region has not been captured previously, converting the image of the region into text, whereby this text is the text to be analyzed.

2. The method of claim 1, wherein when it is determined that an action is to be taken on the target computer or the screen display of the target computer, in response to the analyzed text violating at least one of the rules and policies, causing one or more actions including:

logging the event being analyzed;

closing the current program running on the target computer;

locking out the target computer user by locking the target computer;

disallowing use of the target computer;

notifying an administrator with a notification presented to the administrator on the computer of the administrator;

sending a presentable warning notification to the target computer;

locking the target computer via its keyboard, mouse, inputs and touch screen;

blocking text on the screen display of the target computer; and, blurring at least a portion of the screen display of the target computer, the at least a portion of the screen display including text.

3. The method of claim 1, wherein the obtaining the data of the image of the screen display includes receiving the data of the screen display as transmitted from an agent, on the target computer.

4. The method of claim 1, wherein the rules and policies include triggers, which are activated upon the detection of predetermined text.

5. The method of claim 4, wherein the predetermined text includes at least one of, a value, a regular expression, a program name containing a value, a uniform resource locator (URL), time and day of the image of screen display, and time and day range of the image of the screen display.

6. The method of claim 1, wherein the rules and policies include behavioral rules.

7. The method of claim 1, wherein prior to converting the obtained image into text, the obtained image is stored in storage media.

8. The method of claim 1, wherein the text and data associated with the image of the screen display is indexed and stored in storage media.

9. The method of claim 7, wherein the data associated with the image includes one or more of: the time the screen display of the image was captured, the target computer from which the screen display was captured, the application being run by the target computer, the web site to which the browser of the target computer was directed, the location on the screen display of the rule or policy violating text, whether the text triggered any rules and policies, the rules and policies triggered, and metadata.

10. A system for reactively mining computer screens comprising:

a first server configured for obtaining data of an image of a screen display from a target computer; and a second server configured for:

receiving the data of the image of the screen display;

converting the data of the image into text, including determining regions on the image that hold text, and converting the image in each region into text;

analyzing the text of the regions to determine whether there are rules and policies to be applied to the text; and, should there be rules and policies to be applied to the text, determining whether the analyzed text violates at least one of the rues and policies, and, if at least one of the rules and policies is violated, the first server determining whether action is to be taken on the target computer or the screen display of the target computer, wherein the second server is further configured for:

assigning a hash digest for each region;

determining, for each region whether the same hash digest has been captured previously; and, if the same hash digest for the region has been captured previously, obtaining the text of the region as the text to be analyzed; and, if the same hash digest for the region has not been captured previously, converting the image of the region into text, whereby this text is the text to be analyzed.

11. The system of claim 10, wherein the first server, upon determining that an action is to be taken on the target computer or the screen display of the target computer, in response to the analyzed text violating at least one of the rules and policies, is configured for causing one or more actions including:

logging the event being analyzed;

closing the current program running on the target computer;

locking out the target computer user by locking the target computer;

disallowing use of the target computer; notifying an administrator with a notification presented to the administrator on the computer of the administrator;

sending a presentable warning notification to the target computer;

locking the target computer via its keyboard, mouse, inputs and touch screen;

blocking text on the screen display of the target computer; and, blurring at least a portion of the screen display of the target computer, the at least a portion of the screen display including text.

12. The system of claim 10, additionally comprising, an agent for sending the data of the image of the screen display on the target computer to the first server.

13. The system of claim 10, wherein the rules and policies include triggers, which are activated upon the detection of predetermined text.

14. The system of claim 13, wherein the rules and policies include behavioral rules.

15. The system of claim 13, wherein the predetermined text includes at least one of, a value, a regular expression, a program name containing a value, a uniform resource locator (URL), time and day of the image of screen display, and time and day range of the image of the screen display.

* * * * *